Dec. 4, 1951
H. A. SKINNER
2,577,666
METHOD OF POPPING CORN
Filed April 6, 1950
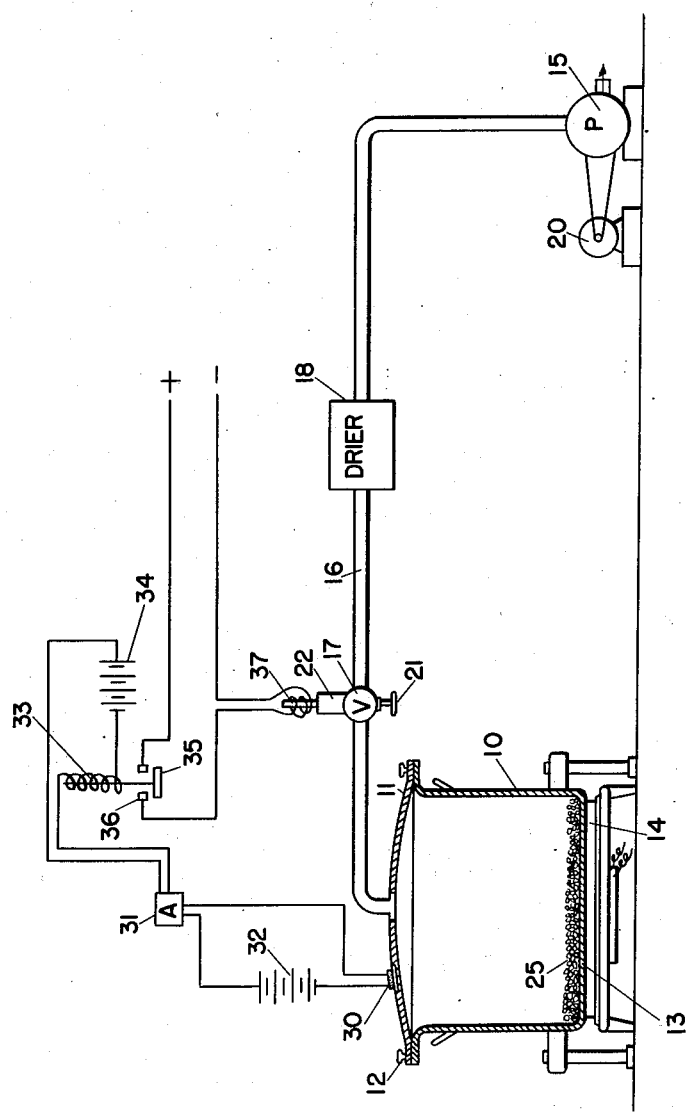
INVENTOR
HAROLD A. SKINNER
BY
Toulmin & Toulmin
ATTORNEYS Patented Dec. 4, 1951

2,577,666

UNITED STATES PATENT OFFICE 2,577,666

METHOD OF POPPING CORN

Harold A. Skinner, New Carlisle, Ohio

Application April 6, 1950, Serial No. 154,285

6 Claims. (Cl. 99—81)

This invention relates to a method for producing popped corn.

Pop corn sales have increased in the last few years to such an extent that the sale of popped corn represents a large enterprise.

Commercial methods of popping pop corn for packaging follow generally the same procedure that has been practiced for many years with exceedingly variable results being obtained as to the edible quality of the popped pop corn and the amount of unpopped kernels that remain in the popper. It has been considered for many years that the major factor to control for obtaining a satisfactory popping of pop corn is the moisture content of kernels which should be held closely to a 13.6% moisture content. In the usual popping methods of popping corn in open containers, it has been found that if the moisture content of the pop corn varies as much as 1% that satisfactory corn popping conditions are not obtained.

It is therefore an object of this invention to provide a method for producing popped corn that will improve the edible quality of the popped corn and will practically eliminate the undesirable factor of unpopped kernels remaining in a batch of pop corn.

It is another object of the invention to provide a method of producing pop corn wherein the pop corn kernels are conditioned to a stage of readiness for popping whereafter the conditions under which the kernels are conditioned are altered to result in a complete popping of the pop corn kernels and above normal enlargement of the white starchy edible mass resulting from the popping of the pop corn kernel.

More specifically, it is an object of this invention to condition pop corn kernels to a state of readiness for popping during a time when the pop corn kernels are retained under atmospheric conditions to apply pressure upon the pop corn kernels greater than that in the period in which the pop corn kernels are allowed to explode as a result of the creation of steam pressure within the kernel.

To accomplish the foregoing object it is therefore another object of this invention to condition pop corn kernels to a stage of readiness for popping in a closed pressure vessel, and to relieve the pressure within the pressure vessel to a low vacuum whereby the intensity of the explosion of the pop corn kernel is greatly increased resulting in an above average enlargement of the white starchy edible mass and in a substantially complete popping of the kernels because of the sudden release of pressure from the exterior of the kernel which allows more satisfactory explosion of the kernel even though steam pressure within the kernels may vary over a relatively wide range as a result of the difference in moisture content of the individual pop corn kernels.

Further objects and advantages will become apparent from the following description and the drawing.

The figure of the drawing illustrates diagrammatically an apparatus by which the method of this invention can be practiced.

In this invention pop corn kernels are placed in a closed pressure tight vessel together with a small amount of popping oil, lard or butter sufficient to prevent scorching of the kernels. The use of the popping oil, lard or butter is conventional practice. The bottom wall of the vessel upon which the pop corn kernels rest is heated to a suitable high temperature to condition the pop corn kernels to a stage at which they are ready to explode as a result of the generation of the steam within the kernels.

This state of readiness to pop is signaled by a slow popping of several kernels. As soon as this first popping signal is given, the interior of the closed pressure tight vessel has the atmosphere therein reduced to a vacuum of 28" of mercury, or better, as quickly as commercially practical.

The action of the quick reduction of the pressure within the vessel containing the conditioned pop corn kernels results in an immediate release, or popping, of the steam from within the kernels. So long as a pressure is retained on the exterior of the kernels, the pressure that must be generated within the kernels must overcome the external pressure on the kernel to a predetermined degree before the kernel can explode. Since the pressure built up within the kernel while it is held under external pressure will be at that value required to explode the kernel under the pressure conditions under which it is held, it will be appreciated that a quick reduction of external pressure on the kernel with the internal pressure within the kernel remaining the same will result in a much more violent explosion of the kernel than could have occurred with the kernel held under external pressure conditions.

Thus, even though the internal pressure of the kernels varies over a substantial range as a result of a difference in moisture content of the kernels, the reduction of external pressure on the kernels places them in an atmosphere in which the critical balance between internal kernel pressure and external kernel pressure is avoided since the internal pressure of the vessel is dropped to a very high degree of vacuum without any change in the internal pressure of the kernel. Thus, even those kernels that have a weak internal pressure, which would not normally pop because the internal pressure of the kernel was too weak to overcome the external pressure on the kernel, will pop when the external pressure on the kernel is reduced to a point of high vacuum.

Therefore, the method of this invention accomplishes two results, namely, that of providing for substantially complete popping of all pop corn kernels and of providing for a more violent popping action of the individual kernels by which the volume of the starchy edible mass is greatly increased.

In the drawing there is illustrated an apparatus by which the method of producing popped corn can be practiced.

In this apparatus there is provided a closed pressure tight vessel 10 that has a removable lid 11 secured to the vessel 10 in any suitable manner by which the joint between the lid 11 and the vessel 10 is a pressure tight joint. Suitable thumb screws 12 can be provided to securely hold the lid 11 on the vessel 10 and make for a pressure tight vessel.

The vessel 10 has the bottom wall 13 thereof heated by any suitable heating device, such as an electric heating coil 14.

The interior of the pressure tight vessel 10 is connected with a vacuum pump 15 of any suitable commercial type by means of a conduit 16. The vacuum pump 15 can be driven by an electric motor 20. A control valve 17 is placed in the conduit 16 to regulate connection between the interior of the vessel 10 and the vacuum pump 15. When this valve 17 is closed there is no connection between the vessel 10 and the pump 15. However, when the valve 17 is opened the vacuum pump 15 can reduce the internal pressure of the vessel 10 to whatever low point the vacuum pump 15 is capable of producing. A drier 18 is placed in the conduit 16 ahead of the vacuum pump 15 to prevent moisture from the pop corn kernels being popped in the vessel 10 from passing to the vacuum pump 15.

The control valve 17 is provided with a control handle 21 that provides for manual operation of the valve 17 to open or close the same. The valve 17 can also be operated automatically by means of an electric solenoid 22 in a manner which will be hereinafter described.

Since the method of popping corn can be performed solely by manual operation of the valve 21, the method will be described in more detail by such manual control of the valve before making reference to any automatic control of the apparatus for performing the method of popping corn.

In the method of producing popped corn, pop corn kernels 25 are placed on the bottom wall of the vessel 10. Also, a siutable amount of popping oil, lard or butter is placed in the vessel 10 to prevent scorching and sticking of the kernels. However, if desired the popping of the kernels can be occasioned in a purely dry condition. When the pop corn kernels have been placed in the vessel 10 the lid 11 is then placed upon the vessel and sealed by the thumb screw 12. It will be noted that at this time the interior atmosphere of the vessel 10 is normal atmospheric condition, thus placing atmospheric pressure within the vessel 10. The valve 21 is closed to prevent communication between the interior of the vessel 10 and the vacuum pump 15 so that during the conditioning period of the pop corn kernels the vacuum pump cannot reduce the pressure within the vessel 10.

The pop corn kernels 25 are heated to a temperature of from 450° to 500° by means of the heating element 14, this heating occurring in approximately one minute. During this heating of the pop corn kernels they are retained under the atmospheric pressure conditions of the interior of the vessel 10, or such pressure increase as will normally occur by a heating of the air within the vessel 10. I have found that pop corn having a moisture content of from 14% to 14.5% gives the most satisfactory popping in my method.

Heating of the pop corn kernels to within the beforementioned temperature range, conditions the pop corn kernels to a stage of readiness for popping as a result of the generation of steam internally of the pop corn kernels, the steam pressure being sufficient that when the kernels have been heated for about one minute under temperature conditions previously mentioned the internal steam pressure of the corn kernels is sufficiently high to over-balance the external pressure on the corn kernels within the interior of the vessel 10 so that they will explode.

However, anyone who has ever popped pop corn will recognize that the first popping of corn kernels occurs very slowly with a single kernel popping first followed by two or three more in quick succession and thereafter the kernels pop rapidly. The popping of the first kernel signals to the operator that the pop corn kernels are conditioned to a stage at which they are in readiness for popping. Immediately upon hearing this signal the operator will open valve 21 to connect the interior of the vessel 10 with the vacuum pump 15 so that the vacuum pump can reduce the internal pressure of the vessel 10 at a very rapid rate. The vacuum pump is connected with the vessel 10 during the entire period of the actual popping of the corn kernels so that a maximum vacuum is maintained in the vessel 10 during the entire actual popping of the corn kernels and thus provide for maximum popping of the kernels. This connection with the vacuum pump with the interior of the vessel 10 also draws off all moisture from within the vessel 10 as introduced therein by the explosion of corn kernels so that the moisture will be removed immediately from the atmosphere around the popped kernels to prevent absorption of moisture by the popped kernels. This maintains the popped kernels in a dry condition and gives them maximum tenderness. The vacuum pump 10 should be of a capacity sufficient to reduce the internal pressure of the vessel 10 to 28" of mercury, or better, within approximately five seconds.

Since the pop corn kernels were conditioned to pop under pressure conditions in the vessel of at least atmospheric pressure, the sudden reduction of the internal pressure of the vessel 10 to 28" of mercury, or better, without any change in the internal steam pressure conditions of the kernels results in an immediate explosion of the corn kernels since their internal steam pressure is far above a value sufficient to overcome the external pressure on the kernels.

The explosion of the pop corn kernels when the pressure is reduced within the vessel 10 has such an increase in violence that the white starch edible mass is increased in size by at least 15%, this increase running as high as 25% under most favorable conditions. Such an increase in the size of the edible portion of the pop corn kernel results in a tenderness of the edible mass that is not approached by popped corn popped in conventional practices.

Also, the increase in size of the popped kernels has a decided sales advantage by way of economy where the popped corn is sold by bag size since less popped corn is required to fill a bag of any selected size or where popped corn is sold on net weight, the bag size will be greatly increased over the bag size of other commercially popped corn which creates a decided sales appeal.

While the method of popping corn has been described previously as a manual operation, yet automatic control can be obtained over the valve 17 to open it to interconnect the interior of the vessel 10 and the vacuum pump 15 at the precise time the first kernel of corn explodes.

For this purpose a sound sensitive device 30, such as a microphone or the like, is placed in the lid 11 so that the sound waves created by the explosion of a corn kernel will strike the sound sensitive device 30 and by agitation of the usual carbon pile cause a current variance to flow through the amplifier 31 which is in circuit with the current source 32. A relay coil 33 is in circuit with the amplifier and the current source 34 so that the amplified current can operate the relay switch 35 to close the contacts 36 and thereby energize the solenoid coil 37 to open the valve 17 at the time the sound sensitive device 30 is rendered active by the popping of the first corn kernel. It will thus be seen that the operation of the apparatus can be made completely automatic to obtain the optimum results desired.

By utilizing the method of popping corn disclosed herein, the moisture content of the pop corn can vary as much as 1½% from that which is considered the optimum moisture percentage, 13.6%, with satisfactory popping results being obtained.

While in the description of the method of popping corn set forth herein a positive pressure, such as atmospheric pressure, is stated as being within the vessel 10 at the time the pop corn kernels are brought to a popping condition, yet it will be understood that this pressure can vary from atmospheric pressure, and that it is possible to utilize an absence of pressure in the vessel at this time, such as a vacuum of a value of 1" of mercury. The primary factor is that the corn kernels are brought to a stage in which they are ready to pop or explode under one atmospheric condition, and immediately upon a signal that the corn kernels are in a condition for popping, such as by a popping of one or two kernels, the atmospheric conditions under which the corn kernels are preconditioned is changed to one having a much lower pressure value than the first atmospheric condition under which the corn kernels were preconditioned. This sudden change in the atmospheric condition causes a violent popping or explosion of the corn kernels as previously set forth herein.

While the method disclosed and described herein constitutes a preferred practice of the invention, yet it will be understood that the method is susceptible of variations without departing from the spirit of the invention, and that all modifications that fall within the scope of the appended claims are intended to be included herein.

Having thus fully described my invention, what I claim as new and desire to secure as Letters Patent is:

1. The method of producing popped pop corn of an increased size that includes, heating the corn kernels in one atmospheric condition to a stage at which they are ready for popping in that atmospheric condition as signalled by initial popping of any heated kernel therein, and immediately thereafter popping the kernels in a second atmospheric condition of reduced pressure from that of the first condition.

2. The method of producing popped pop corn of an increased size that includes, heating corn kernels in a first atmospheric condition of pressure to a stage at which they are ready for popping in the pressure atmosphere, and immediately thereafter popping the kernels in a second atmospheric condition of vacuum.

3. The method of producing popped pop corn of an increased size that includes, heating corn kernels in a first atmospheric condition to a stage at which they are ready for popping in the said atmospheric condition, and immediately thereafter popping the kernels in a second atmospheric condition of substantially less pressure than the first atmospheric condition while continuously removing from the second atmospheric condition steam released from the kernels.

4. The method of producing popped pop corn of an increased size that includes, heating corn kernels in a pressure atmosphere to a stage at which they are ready for popping in the said pressure atmosphere, and immediately thereafter popping the kernels in an atmosphere of vacuum while continuously removing steam released from the kernels from the vacuum atmosphere.

5. The method of producing popped pop corn of an increased size that includes, heating corn kernels in one atmospheric condition to a stage at which they are ready for popping in that atmospheric condition, and immediately thereafter reducing the atmospheric condition to that of a vacuum of a value of approximately 28" of mercury and maintaining the said vacuum during popping of the corn.

6. The method of producing popped pop corn of an increased size that includes, heating corn kernels in one atmospheric condition at a temperature of from 450° F. to 500° F. to a stage at which they are ready for popping in that atmospheric condition, and immediately thereafter reducing the atmospheric condition to that of a vacuum of a value of approximately 28" of mercury and maintaining the said vacuum during popping of the corn.

HAROLD A. SKINNER.

REFERENCES CITED

The following references are of record in the file of this patent:

UNITED STATES PATENTS

| Number | Name | Date |
| --- | --- | --- |
| 1,104,990 | Harding | July 28, 1914 |

OTHER REFERENCES

Farmer's Bulletin No. 1679, U. S. Dept. of Agr., March 1948, Govt. Printing Office (104), pages 13–14.